United States Patent [19]

Kobayashi

[11] Patent Number: 4,819,715
[45] Date of Patent: Apr. 11, 1989

[54] AUTOMATIC AIR CONDITIONING SYSTEM FOR AN AUTOMOTIVE VEHICLE

[75] Inventor: Shinma Kobayashi, Hiratsuka, Japan

[73] Assignee: Nissan Shatai Company, Limited, Kanagawa, Japan

[21] Appl. No.: 891,430

[22] Filed: Aug. 4, 1986

Related U.S. Application Data

[63] Continuation of Ser. No. 603,841, Apr. 25, 1984, abandoned.

[30] Foreign Application Priority Data

Sep. 14, 1983 [JP] Japan ............... 58-169733

[51] Int. Cl.$^4$ .............. G05D 23/00; F25B 29/00
[52] U.S. Cl. .................... 165/16; 165/22; 165/27; 165/42; 165/43; 237/2 A; 237/12.3 B; 98/2.01
[58] Field of Search ............ 165/12, 16, 42, 43, 165/103, 38, 22, 27; 236/13; 98/2.01; 237/2 A, 12.3 B

[56] References Cited

U.S. PATENT DOCUMENTS

| | | | |
|---|---|---|---|
| 4,337,818 | 7/1982 | Franz | 165/43 |
| 4,368,843 | 1/1983 | Kai et al. | 165/12 |
| 4,417,618 | 11/1983 | Yoshimi et al. | 165/16 |
| 4,440,212 | 4/1984 | Tanino et al. | 165/42 |
| 4,448,035 | 5/1984 | Monyama et al. | 98/2.01 |
| 4,456,166 | 6/1984 | Kogahata | 165/43 |
| 4,460,036 | 7/1984 | Yoshimi et al. | 165/42 |
| 4,478,274 | 10/1984 | Naganoma et al. | 165/12 |
| 4,513,808 | 4/1985 | Ito et al. | 165/43 |
| 4,537,245 | 8/1985 | Nishimura et al. | 165/43 |
| 4,681,153 | 7/1987 | Uchida | 165/42 |

FOREIGN PATENT DOCUMENTS

| | | | |
|---|---|---|---|
| 0043017 | 4/1981 | Japan | 62/239 |
| 0026010 | 2/1982 | Japan | 62/239 |
| 0182514 | 11/1982 | Japan | 165/42 |

Primary Examiner—Albert W. Davis, Jr.
Assistant Examiner—John K. Ford
Attorney, Agent, or Firm—Foley & Lardner, Schwartz, Jeffery, Schwaab, Mack, Blumenthal & Evans

[57] ABSTRACT

An automatic air conditioning system for an automotive vehicle can operate in vent mode, bi-level mode or heater mode, the automatic selection of which is adjusted on the basis of air conditioning-influencing external conditions. The heat value required to adjust the room temperature in a vehicle cabin is derived in accordance with the air conditioning-influencing external conditions. The operation mode is selected depending upon the derived heat value. Changeover between heater, bilevel and vent modes is effected as a function of computed heat value and set-temperature.

3 Claims, 8 Drawing Sheets

AUTOMATIC AIR CONDITIONING SYSTEM FOR AN AUTOMOTIVE VEHICLE

This application is a continuation of application Ser. No. 603,841, filed Apr. 25, 1984 now abandoned.

BACKGROUND OF THE INVENTION

The present invention relates generally to an automotive automatic air conditioning system which automatically controls system operation according to predetermined mode switching parameters. More particularly, the invention relates to a mode selecting procedure in an automatic air conditioning system for an automotive vehicle.

Under automatic control, air outlets discharging conditioned air are selected to be open or closed according to the selected operational mode and in accordance with the open-degree of an air-mix door. Conventionally, one of the per se well-known VENT, BI-LEVEL, and HEATER modes is selected depending upon the air-mix door open ratio. In such conventional air-mix door open-degree-dependent mode selection procedures, it is possible that the selected operational mode will not precisely correspond to other air conditioning parameters. For instance, the temperature of the discharged air at a given air-mix door open-degree is not always the same and in fact will vary according to various temperature-influencing factors such as ambient temperature and insolation. Furthermore, different occupants in the passenger compartment may subjectively feel hot or cold even at substantially the same compartment temperature and/or at the same conditioned air temperature. Such subjective tastes sometimes engender selection of an operational mode different from that selected with regard solely to air-mix door open-degree.

SUMMARY OF THE INVENTION

Therefore, it is a principle object of the present invention to provide an automotive automatic air conditioning system which has a mode selecting procedure which more closely coincides with the subjective selection made by vehicle occupants.

Another and more specific object of the present invention is provide an automatic air conditioner system which selects its operational mode while taking into account various control parameters affecting the occupants' feelings, such as ambient air temperature and insolation.

Another object of the present invention to provide an automatic air conditioning system which has two mutually independent air-mix chambers in which the temperatures of two sources of discharge air can be controlled independently so that the temperature of air directed to the upper and lower parts of the passenger compartment can be controlled independently.

In order to accomplish the above-mentioned and other objects, an automatic air conditioning system for an automotive vehicle has a mode selector which derives the appropriate operational mode of the conditioner system and switches between VENT mode, BI-LEVEL mode and HEATER mode depending upon the heat value required to adjust the air in the passenger compartment to the desired temperature. Ambient air temperature and insolation are taken as control parameters affecting selection of the operational mode and affecting the occupants' feelings. An ambient air temperature sensor and an insolation sensor are accordingly installed in the air conditioning system to provide ambient air temperature data and insolation data as mode selector parameters.

In the preferred embodiment, the air conditioning system defines upper and lower air-mix chambers which allow independent adjustment of the temperatures of two separate air regimes. In order to facilitate adjustment of the conditioned air temperatures independently in the upper and lower air-mix chambers, first and second air-mix doors are provided to allow adjustment of the proportions of heated air and cool air in each of the upper and lower air-mix chambers.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment, but are for explanation and understanding only.

In the drawings.

BRIEF DESCRIPTION OF THE PREFERRED EMBODIMENT

It should be noted that this application is one of six related patent applications in the United States of America filed on the same date as the present application. The related applications are listed below:

| U.S. Application Serial No. | Title of the Invention |
|---|---|
| 603,903, now U.S. Pat. No. 4,681,153 issued 7/21/87 | Automotive Air Conditioning System With Independent Temperature Control For Dual Air Flows |
| 603,830, now abandoned | Method and Apparatus For Air Conditioner Control |
| 603,829, now U.S. Pat. No. 4,562,954 issued 1/7/86 | Method and Apparatus For Air Conditioner |

-continued

| U.S. Application Serial No. | Title of the Invention |
| --- | --- |
| 603,828 now U.S. Pat. No. 4,523,715 issued 6/18/85 | Control Method and Apparatus For Air Conditioner Control |
| 603,904 now U.S. Pat. No. 4,730,662 issued 3/15/88 | AUTOMOTIVE AUTOMATIC AIR CONDITIONING SYSTEM HAVING VARIABLE TEMPERATURE DEMIST MODE |

The contents of the five co-pending related applications listed above are hereby incorporated by reference.

In addition, the following co-pending U.S. patent applications discloses inventions related to the present invention and assigned to the common Assignee.

| U.S. Ser. No. | Filing Date |
| --- | --- |
| U.S. Pat. No. 4,617,986 | August 30, 1983 |
| U.S. Pat. No. 4,602,675 | August 30, 1983 |
| U.S. Pat. No. 4,498,309 | August 26, 1983 |
| U.S. Pat. No. 4,538,760 | August 25, 1983 |

The contents of the above-listed co-pending U.S. patent applications are also hereby incorporated by reference.

Figure 1:
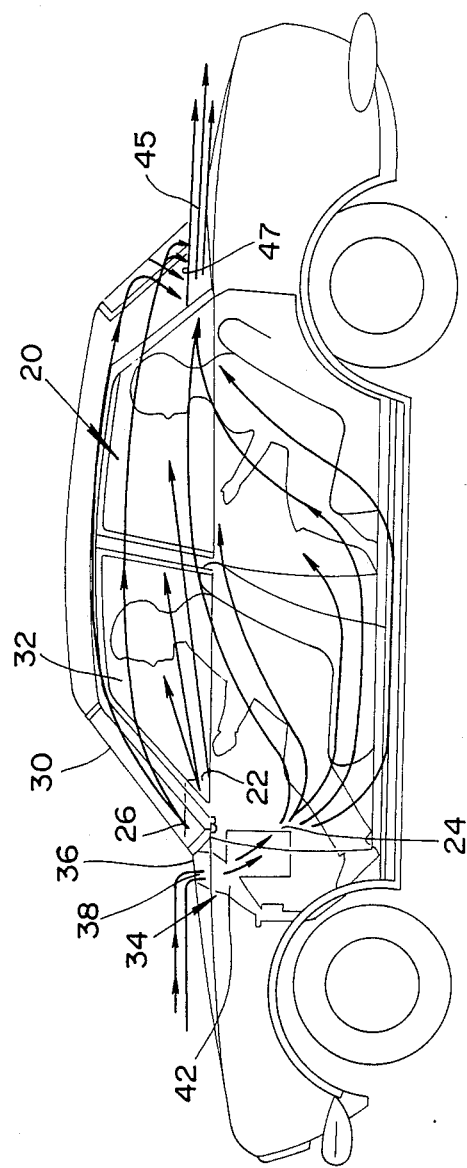
FIG. 1 is a diagram of air flow through an automotive vehicle in which the preferred embodiment of an automatic air conditioning system according to the present invention is installed.
Figure 2:
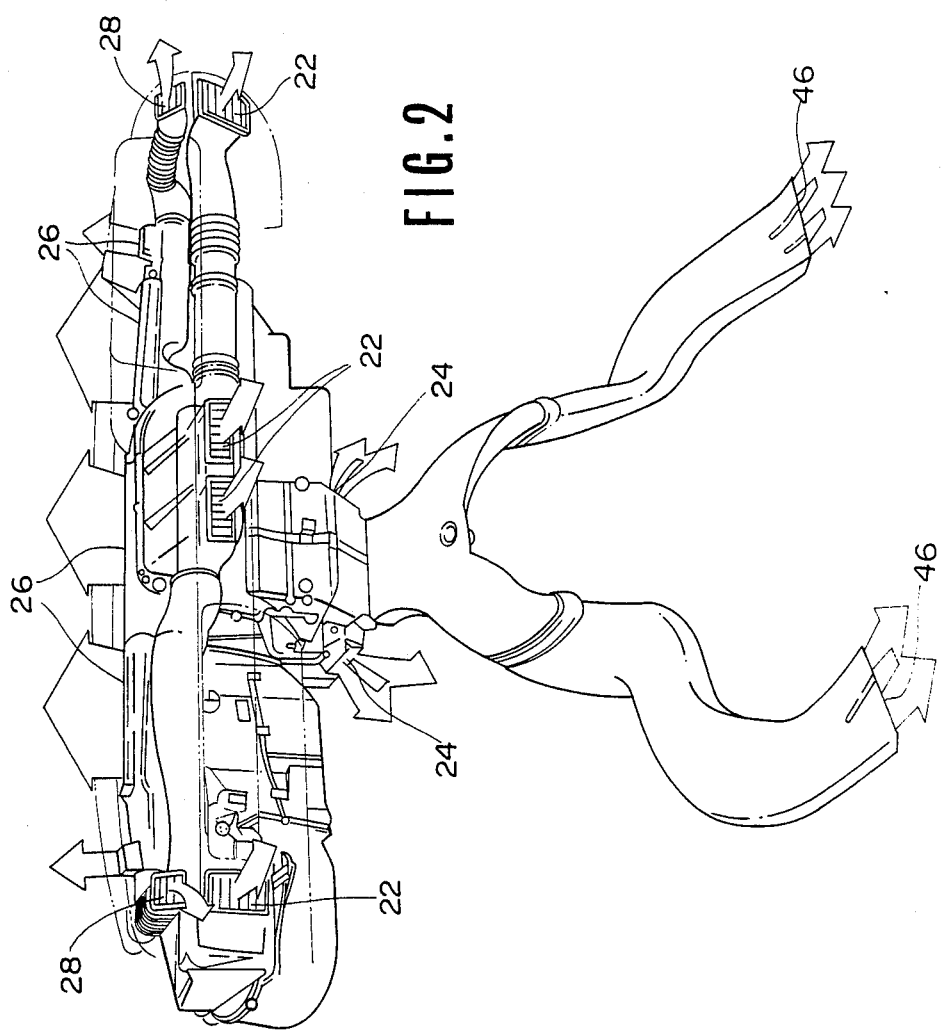
FIG. 2 is an illustration of the portion of the air conditioning system inside of the vehicle of FIG. 1 and showing the positions of an upper vent air outlet, a lower vent air outlet, a defroster nozzle and others.

Referring now to the drawings, particularly to FIGS. 1 and 2, the major air flow regimes of a dual-flow automotive air conditioning system have been illustrated. In general, the automotive air conditioning system controls the temperature and humidity of air within the passenger compartment 20. The air conditioning system can operate in a VENT mode for ventilating the compartment air, a HEATER mode for increasing the compartment temperature, a BI-LEVEL mode for delivering relatively cool air through a upper air outlet 22 and relatively warm air through a lower air outlet 24 or a DEFROSTER mode for delivering hot air through defroster nozzles 6 and 28. The air conditioning system can also operate in AUTO mode to automatically control the positions of the upper air outlet 22, the lower air outlet 24 and the defroster nozzles 26 and 28 as well as controlling the air temperatures at the upper and lower vents.

The upper air outlet 22 serves as the aforementioned upper vent and the lower air outlet 24 serves as the aforementioned lower vent. The defroster nozzles 26 (hereafter referred to as "front defroster nozzle") are directed toward a front windshield 30 and discharge hot air in order to defrost and/or defog same. The defroster nozzles 28 (hereafter referred to as "side defroster nozzle") are directed toward side door windows 32 and discharge hot, defrosting air to clear the passengers' windows.

The air conditioning system also includes an air induction system which is generally referred to by the reference numeral 34. The air induction system 34 includes an ambient air intake 36 opening into a cowl top panel 38 and an internal air intake 40 (shown in FIG. 3) adapted to draw air in from the passenger compartment 20. The air induction system also includes a fresh/recirculate control door 70 selectively connecting an induction passage 42 to either or both of the ambient air intake 36 and the internal air intake 40. Thus, the air conditioning system can operate in FRESH mode in which the ambient air intake 36 alone is connected to the air induction passage 42, RECIRCULATION mode in which the internal air intake 40 alone is connected to the induction passage 42, or INTERMEDIATE mode in which the induction passage 42 is connected to both the ambient air intake 36 and the internal air intake 40. In the shown structure, there is also a rear lower air outlet 46 which deliver air from below the front seats.

In FRESH mode, an air outlet 45 is formed at an appropriate point in the vehicle body in order to vent air from the passenger compartment. The air outlet 45 communicates with a ventilation intake 47 within the passenger compartment.

Figure 3:
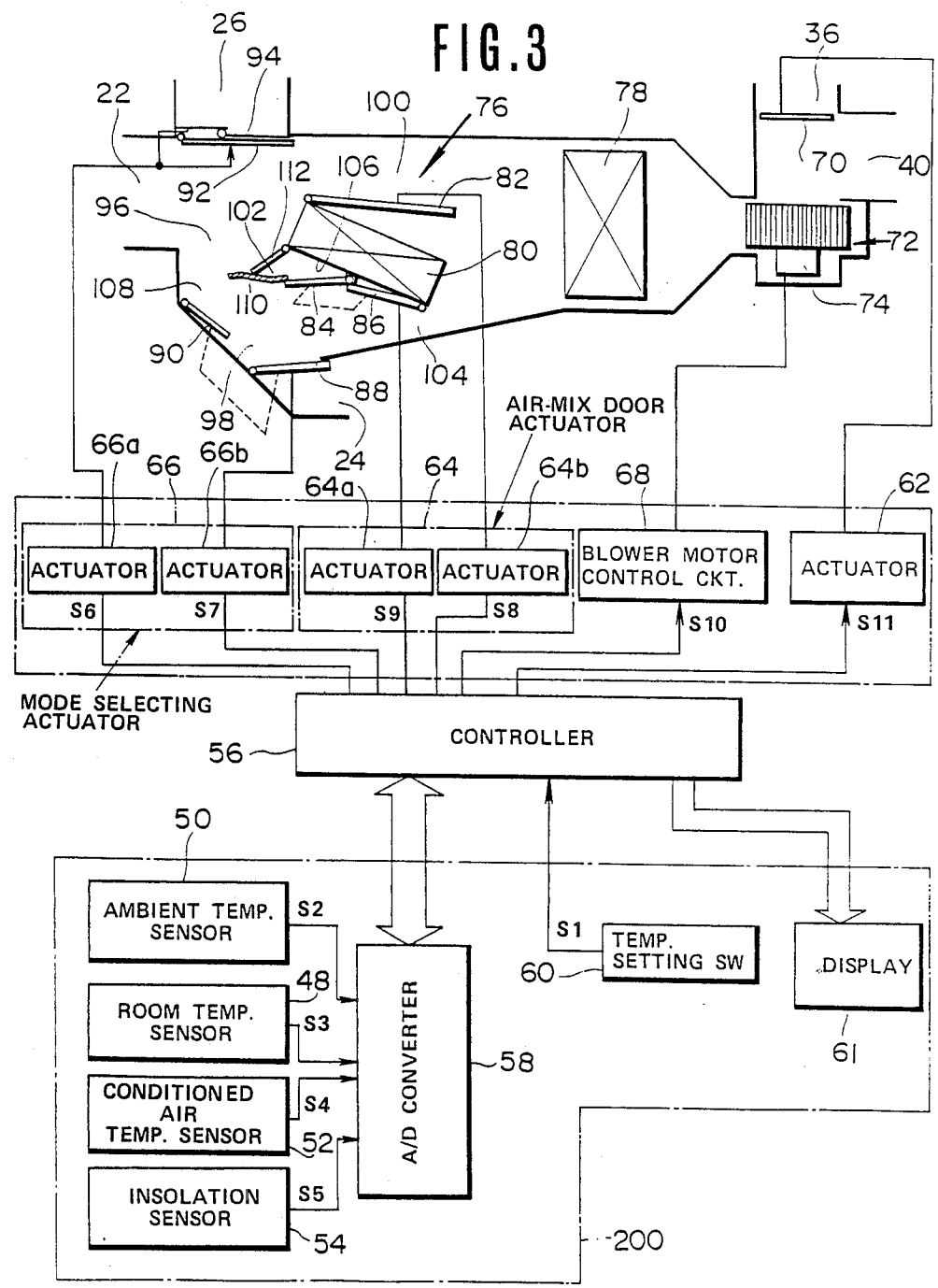
FIG. 3 is a diagram of the preferred embodiment of the automatic air conditioning system according to the present invention.

In order to control the upper and lower vent air temperatures in AUTO mode, a temperature sensor 48, shown diagrammatically in FIG. 3, detects the air temperature within the passenger compartment and produces a signal indicative of the temperature in the passenger compartment, which sensor 48 will be hereafter referred to as "room temperature sensor" and the signal produced by the room temperature sensor will be hereafter referred to as "room temperature signal. Another temperature sensor 50 detects ambient air temperature outside of the passenger compartment and produces a signal indicative of the ambient temperature, which sensor 50 will be hereafter referred to as "ambient temperature sensor" and the signal produced by the ambient temperature sensor will be hereafter referred to as "ambient temperature signal". An additional temperature sensor 52 is provided in a passage communicating with the upper air outlet 22 through which upper vent air flows to detect the temperature of the upper vent air and produce a signal indicative of the upper vent air temperature, which sensor 52 will be hereafter referred to as "conditioned air temperature sensor" and which signal produced by the blower temperature sensor will be hereafter referred to as "conditioned air temperature signal". An insolation sensor is also provided to detect the amount of incident sunshine or insolation and produce a insolation signal.

FIG. 3 schematically illustrates the control system of the air conditioning system. The room temperature sensor 48, the ambient temperature sensor 50, the conditioned air temperature sensor 52 and the insolation sensor 54 are connected to a controller 56 via an analog-to-digital (A/D) converter 58. A temperature selecting switch 60 manually operable to set the desired room temperature is also connected to the controller 56 to supply a set temperature signal representative of the desired room temperature. The controller 56 is, in turn, connected to a display unit 61 to display the set temperature in digital form.

The controller is also connected to a fresh/recirculate selecting actuator 62, an air-mix door control actuator 64 and a mode selecting actuator 66, and to a blower motor control circuit 68. The fresh/recirculate selecting actuator 62 is associated with fresh/recirculate control door 70 provided at the junction of the ambient air intake 36 and the internal air intake 40 to selectively connect the induction passage 42 to one or both of the ambient air intake and the internal air intake. A blower 72 is provided in the induction passage downstream of the fresh/recirculate control door 70. The blower 72 includes a blower motor 74 associated with the blower motor control circuit. The induction passage 42 is connected to an air conditioner unit which is labelled with the reference numeral 76. The air conditioner unit 76 includes an evaporator 78 and a heater core 80, the latter being connected to an engine radiation system so that heated engine coolant can pass therethrough. As is well known, the heater core therefore serves as a kind of heat exchanger for heating air passing therethrough.

An air-mix door 82 is associated with the upstream face of the heater core 80 to control the flow of air through or around the heater core. The air-mix door actuator 64 includes actuators 64a and 64b. The actuator 64b controls the position, or open-degree, of an upper air-mix door 82. The actuator 64a is connected to lower air-mix doors 84 and 86 which co-operate to control the temperature of the lower vent air. The actuator 64a controls the open-degree of the lower air-mix doors 84 and 86.

A lower vent air outlet shutter 88 and a lower vent control door 90 cooperate through a linkage (not shown) to operate alternatingly. For instance, when the lower vent air outlet shutter 88 is opened, the lower vent control door 90 is closed and when the lower vent air outlet shutter is closed, the lower vent control door is opened. Both the shutter 88 and the door 90 are controlled the mode selecting actuator 66. The actuator 66 also controls an upper vent air outlet shutter 92 and a defroster mode door 94. In order to control the positions of the lower vent air outlet shutter 88, the lower vent control door 90, the upper vent air outlet shutter 92 and the defroster mode door 94, the mode selecting actuator 66 comprises actuators 66a and 66b. The actuator 66a is connected to the upper vent air outlet shutter 92 and the defroster mode door 94 to open the upper vent air outlet 22 and close the defroster nozzle in its first position, to open the defroster nozzle 26 and close the upper vent air outlet 22 in its second position and to close both the upper vent air outlet and the defroster nozzle in its third position. On the other hand, the actuator 66b is connected to the lower vent air outlet shutter 88 and the lower vent control door 90. The actuator 66b controls the positions of the lower vent air outlet shutter and the lower vent control door by closing the lower vent air outlet in its first position and opening the lower vent air outlet in its second position.

An upper vent air-mix chamber 96 is defined near the upper vent air outlet 22 and a lower vent air-mix chamber 98 is defined below and downstream of the heater core 80. The upper vent air-mix chamber is connected to an unheated air passage 100 and a heated air passage 102. The lower vent air-mix chamber 98 is exposed to the unheated air passage 104 and opposes the downstream face 106 of the heater core 80. The upper vent air-mix chamber 96 and the lower vent air-mix chamber 98 communicate through a communication passage 108 defined by a through opening formed in an upper-and-lower vent partition 110. The communication passage 108 is opened and closed by means of the lower vent control door 90. On the other hand, a pressure responsive door 112 is hung across the heated air passage 102. The pressure responsive door 112 is responsive to air flow from the upper vent air-mix chamber 96 to the lower vent air-mix chamber 98 to shut the passage 102. In turn, the pressure responsive door 112 is responsive to heated air flowing through the heated air passage from the heater core outlet 106 to the upper vent air-mix chamber 96 to permit the heated air to pass therethrough.

It will be appreciated that when the air conditioning system is operated in COOLER mode, the evaporator is in operation in accordance with the operation of a compressor (not shown) associated with the engine, to cool the intake air.

The nature and use of vent air temperature control parameters has been disclosed in the co-pending U.S. patent application Ser. No. 527,784, filed on Aug. 30, 1983 now U.S. Pat. No. 4,617,986 and assigned to the assignee of the present invention. The disclosure of the co-pending U.S. patent application Ser. No. 527,784 is hereby incorporated by reference for the sake of disclosure. In addition, the U.S. patent application Ser. No. 527,785, filed on Aug. 30, 1983, now U.S. Pat. No. 4,602,675 and also assigned to the assignee of the present invention, discusses the operation of a control system controlling the blower speed by adjusting the voltage to be supplied to the blower motor. The disclosure of the co-pending U.S. patent application Ser. No. 527,785 is hereby incorporated by reference for the sake of disclosure.

Figure 4:
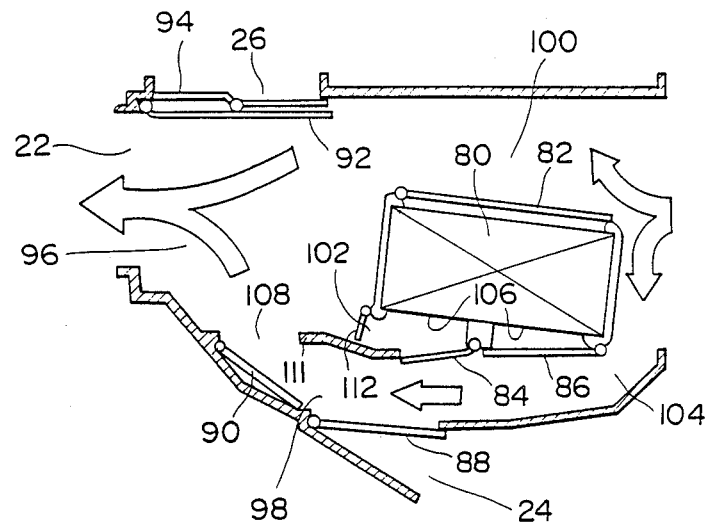
FIG. 4 is a longitudinal section of the air conditioning system in VENT mode.

The operation of the air conditioner in each of VENT, BI-LEVEL and HEATER modes will be described in detail with reference to drawings FIGS. 4, 5 and 6. VENT mode (FIG. 4)

This VENT mode is selected when the room temperature is higher than the set temperature or when the room temperature is held at approximately the set temperature. The temperature of discharge air is so controlled by the open-degrees of the air-mix door 82 and the lower vent air control doors 84 and 86 that the room temperature will be continuously adjusted toward the set temperature.

In the shown position, the air-mix door 82 fully closes the air intake to the heater core 80 and fully opens the unheated air passage 100. On the other hand, the lower vent air control door 86 fully closes the unheated air passage 104 to block air flow therethrough. As a result, the air introduced through the evaporator 78 flows into the upper vent air-mix chamber 96. In this VENT mode, the upper vent shutter 92 is opened to allow the air in the upper vent air-mix chamber 96 to discharge through the upper vent 22. On the other hand, the defroster mode door 94 closes the defroster nozzle to prevent the upper vent air from flowing therethrough. Therefore, the air introduced into the upper vent air-mix chamber 96 is discharged solely through the upper vent 22.

In this mode, the lower vent control door 90 closes the communication passage 108 to block air flow therethrough. Since the air pressure in the upper vent air-mix chamber 96 is higher than that in the lower vent air-mix chamber 98, the pressure responsive door 112 is positioned to seal the heated air passage 102, blocking communication between the upper vent air-mix chamber 96 and the lower vent air-mix chamber 98. As a result, despite the opening of the lower air outlet shutter 88 to open the lower air outlet 24, the relatively cool air will not be discharged through the lower air outlet.

It should be appreciated that, in this VENT mode, the lower vent air control door 86 and the defroster mode door 94 are held closed under all operating conditions. On the other hand, the upper vent shutter 92 is held open. The lower air outlet shutter 88 and the lower vent control door 90 may be alternatively operated to open and close the communication passage 108 and the lower vent 24, so that the air in the upper vent air-mix chamber 96 may not flow through the lower air outlet but the air temperature in the upper vent air-mix chamber 96 can be controlled by the amount of air introduced into the upper vent air-mix chamber via the heater core and the heated air passage.

BI-LEVEL MODE (FIG. 5)

When the air conditioning system is shifted to the BI-LEVEL mode, the defroster mode door 94 and the lower vent control door 90 are closed to block air flow through the defroster nozzle 26 and the communication passage 108 respectively. On the other hand, in this operational mode, the upper air outlet shutter 92 and the lower air outlet shutter 88 are both held open to allow the air in the upper and lower vent air-mix chambers 96 and 98 to be discharged through the upper air outlet 22 and the lower air outlet 24 respectively.

In this BI-LEVEL mode, the air temperatures in the upper and lower vent air-mix chambers 96 and 98 are controlled by adjusting the angular positions of the air-mix door 82 and the lower vent air control doors 84 and 86. By adjusting the air-mix door angle, the amount of air diverted into the heater core 80 from the unheated air passage 100 is determined. On the other hand, by adjusting the open-degree of the lower vent air control door 86, the amount of air flowing through the unheated air passage 104 is determined. By adjusting the air flow rate through the unheated air passage 104, the proportions of heated air and cool air in the lower vent air-mix chamber 98 is determined to adjust the air temperature therein to the temperature derived on the basis of the control parameters such as set temperature, the ambient air temperature, the room temperature, insolation and so forth. The air-mix door and the lower vent air control doors are controlled by the actuator 64 which is, in turn, controlled by the controller 56.

When the air flowing through the unheated air passage 100 is introduced into the heater core 80 to adjust the air temperature, a greater air pressure is applied to the pressure responsive door 112 than that applied from the side of the upper vent air-mix chamber. As a result, the pressure responsive door 112 is opened to establish communication between the upper and lower vent air-mix chambers 96 and 98 through the heated air passage 102. In this case, if the air pressure in the upper vent air-mix chamber 96 increases to a level greater than that in the lower vent air-mix chamber 98, the pressure responsive door 112 is moved by the air pressure in the upper vent air-mix chamber to block the air flow from the upper vent air-mix chamber to the lower vent air-mix chamber. Since the air temperature in the upper vent air-mix chamber 96 is lower than that in the lower vent air-mix chamber 98, the adjusted air temperature in the lower vent air-mix chamber would drop due to the influx from the upper vent air-mix chamber 96 if the pressure responsive door 112 is not present, thus disrupting accurate control of the lower vent air temperature. However, by providing the pressure responsive door 112 as set forth above, the relatively cool air in the upper vent air-mix chamber 96 is successfully prevented from entering the lower vent air-mix chamber 98 and thus the air temperature in the lower vent air-mix chamber can be accurately held at the desired level.

Figure 5:
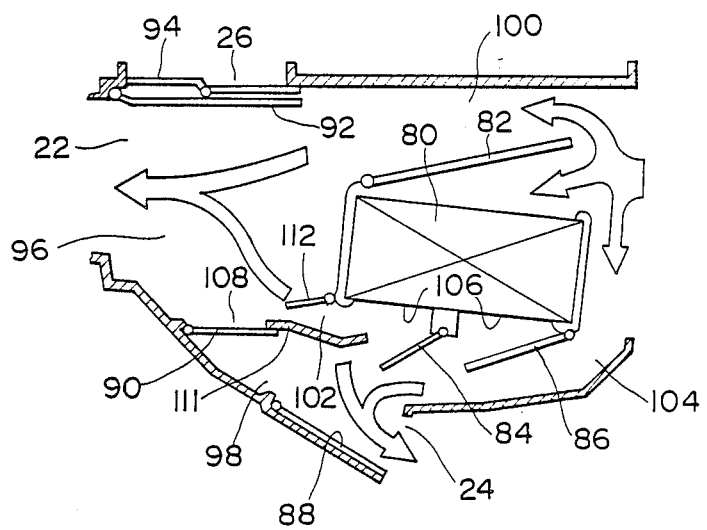
FIG. 5 is a longitudinal section of the air conditioning system in BI-LEVEL mode.
Figure 6:
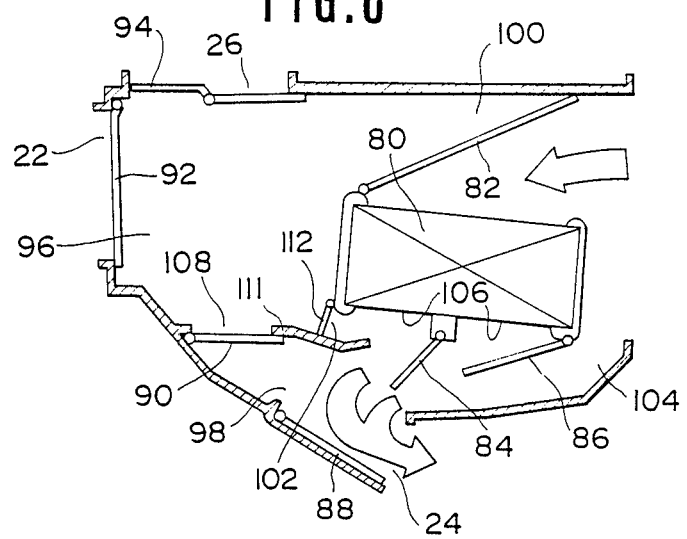
FIG. 6 is a longitudinal section of the air conditioning system in HEATER mode.

The pressure responsive door 112 is particularly effective at the air-mix door and the lower vent air control door positions illustrated in FIG. 5. For BILEVEL mode to be selected, the room temperature must already approximately correspond to the required upper and lower discharge temperatures. Therefore, very little adjustment of the temperature by means of the heater core 80 is required. For this reason, the open angle of the air-mix door 82 will normally be relatively small to divert relatively little air from the unheated air passage 100 into the heater core 80.

In this case, the pressure-responsive door 112 acts to distribute most of the heated air into the lower air-mix chamber 98, thus ensuring the desired thermal distribution. When the air-mix door 82 is nearly closed, the pressure of air entering the upper air-mix chamber 96 via the unheated air passage 100 holds the pressure-responsive door 112 closed against the relatively low pressure in the lower chamber 98. When the air-mix door 82 is opened wider, thus producing more heated air, the lower chamber pressure rises as the upper chamber pressure drops, so that the pressure-responsive door 112 is driven open to relieve the lower chamber pressure and divert about half of the heated air into the upper air-mix chamber 96. In both cases, the passive pressure actuation of door 112 is dynamic, warming the upper air-mix chamber whenever the lower chamber pressure exceeds the upper chamber pressure.

HEATER MODE (FIG. 6)

The HEATER mode may be selected depending upon the control conditions so that the heated air is discharged only through the lower air outlet 24. In this mode, the air-mix door 82 abuts the ceiling of the unheated air passage 100 to block fluid flow into the upper vent air-mix chamber and divert all of the air flowing through the unheated air passage 100 into the heater core 80. In this case, the lower vent air control door 86 abuts the bottom of the unheated air passage 104 to block fluid flow therethrough. On the other hand, the lower vent control door 84 is fully opened to allow the heated air from the heater core to flow through the heated air outlet 106.

In addition, in the HEATER mode, the upper vent shutter 92 closes the upper vent 22 and the defroster mode door 94 fully closes the defroster nozzle 26. The lower vent control door 90 blocks communication passage 108. As a result, the upper vent air-mix chamber 96 is fully closed off. As the lower vent shutter 88 is so linked as to be actuated in reverse to the lower vent control door 90, it is opened to allow the air in the lower vent air-mix chamber to exit through the lower vent 24. Therefore, the heated air discharged through the heater core 80 is discharged through the lower air outlet 24.

At this position, because of air leakage around air mix door B2 the air pressure in the upper vent air-mix chamber 96 will quickly become higher than that in the lower vent air-mix chamber 98, shutting the pressure responsive door 112. As a result, the heated air, after the pressure responsive door is closed, only flows through the lower vent air-mix chamber to the lower air outlet 24.

Figure 7:
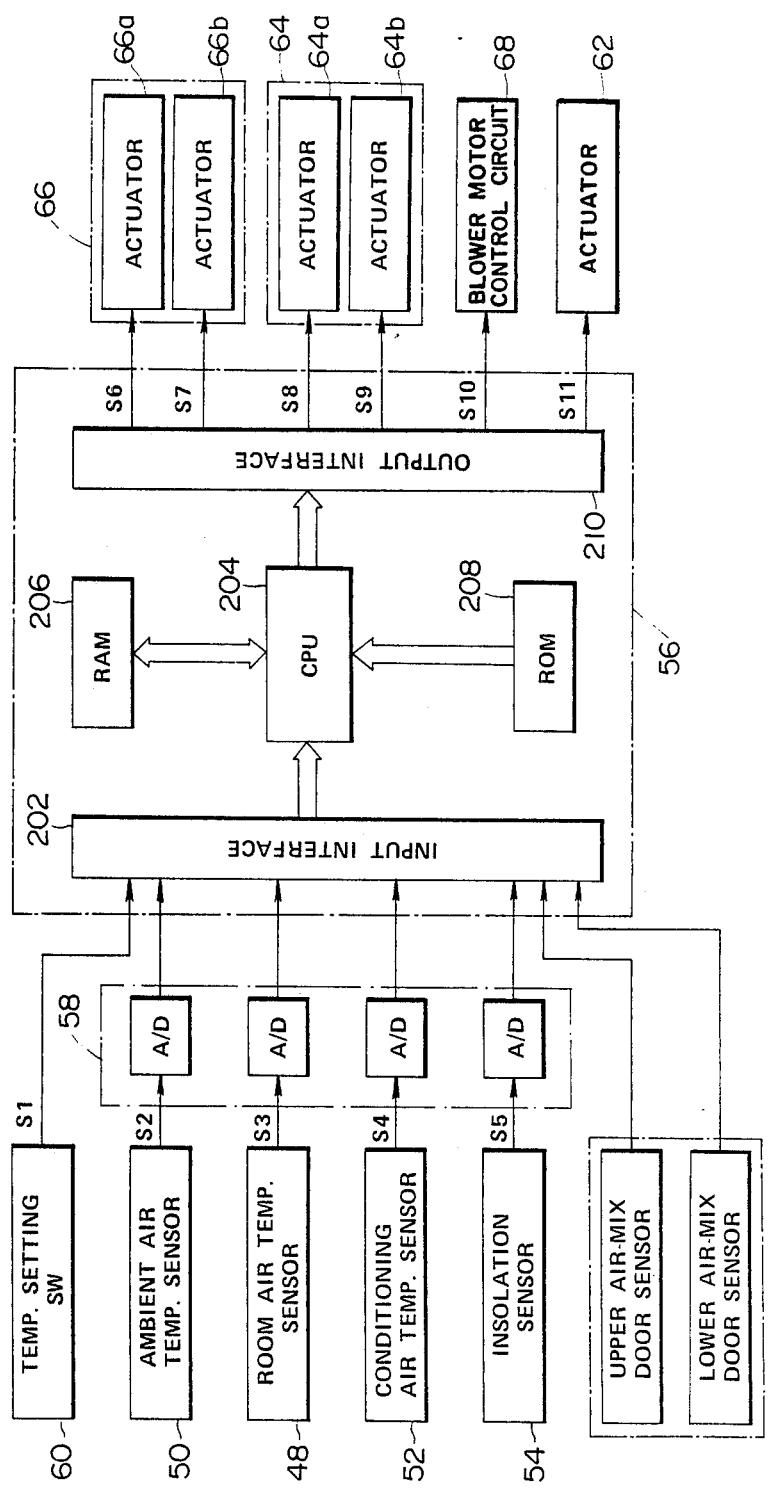
FIG. 7 is a block diagram of a controller in the preferred embodiment of air conditioning system of FIG. 3.

Referring to FIG. 7, the preferred embodiment of the sensor, controller and actuator stages of the air conditioning system has been illustrated in greater detail than in FIG. 3. The controller 56 comprises a microprocessor including an input interface 202, CPU 204, RAM 206, ROM 208 and output interface 210. The ambient air temperature sensor 50, room temperature sensor 48, the conditioned air temperature sensor 52 and insolation sensor 54 are connected to the input interface 202 via analog-to-digital (A/D) converters 68 to supply respectively the ambient air temperature-indicative signal $S_2$, the room air temperature-indicative signal $S_3$, the conditioned air temperature-indicative signal $S_4$ and insolation-indicative signal $S_5$.

The input interface 202 of the controller 56 is also connected to the temperature selecting switch 60 to receive the set temperature-indicative signal $S_1$.

The input interface 210 of the controller 56 sends a pair of control signals $S_8$ and $S_9$ to the air-mix door actuator 64 to control the positions of the upper and lower air-mix doors 82 and 84, 86 respectively. The output interface 210 is also connected to the fresh/recirculate switching actuator 62 to control the position of the fresh/recirculate control door 36 via a control signal $S_{11}$ and to the mode selecting actuator 66 for controlling the door positions of the defroster mode door 94 and the upper vent air outlet shutter 92, and the lower vent air outlet shutter 88 and the lower vent control door via control signals $S_6$ and $S_7$, respectively. The controller 56 also derives the required blower speed and sends a control signal $S_{10}$ to the blower motor control circuit 68 to control the speed of the blower motor.

ROM 208 holds values defining mode selecting criteria between VENT mode and BI-LEVEL mode and between BI-LEVEL mode and HEATER mode. Preferably, the values of the mode selecting criteria may be stored in the form of look-up tables accessed or indexed in terms of preselected mode selecting parameters. In accordance with the shown embodiment, the values of the mode selecting criteria will be indexed in terms of the heat value required to achieve the desired cabin temperature.

Figure 8:
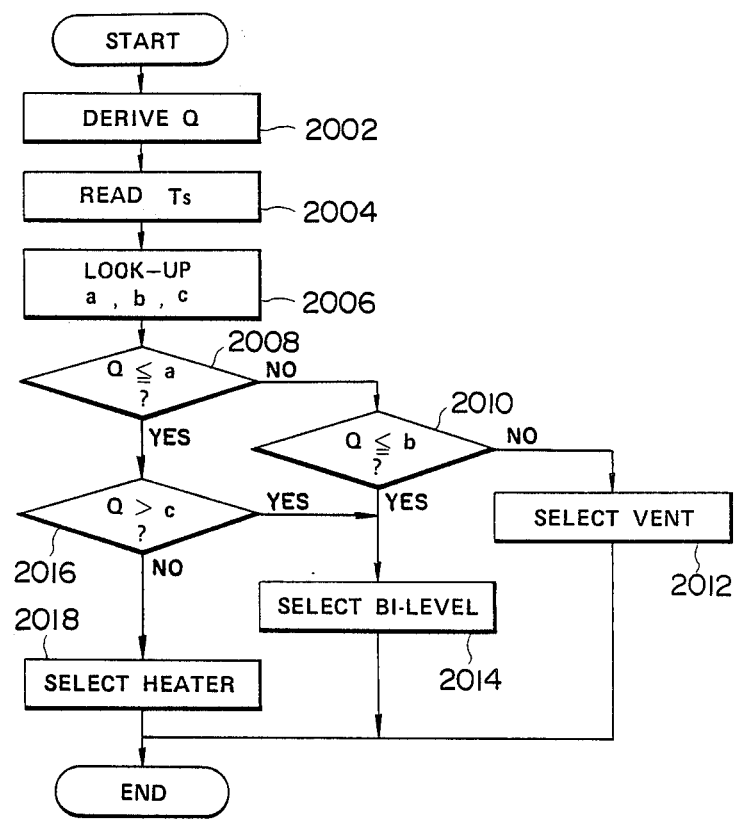
FIG. 8 is a flowchart of a program for selecting operation mode.
Figure 9:
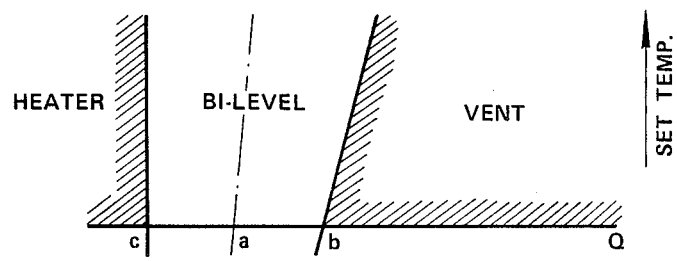
FIG. 9 is a chart showing mode selecting criteria between VENT mode and BI-LEVEL mode and between BI-LEVEL mode and HEATER mode.

The procedure for selecting the operation mode of the air conditioning system will be described below with reference to FIGS. 8 and 9. FIG. 8 is a flowchart of a mode selecting program which produces the control signals $S_6$ and $S_7$ controlling the mode selecting actuator 66. On the other hand, FIG. 9 charts the values of the mode selecting criteria to be compared with the derived required heat value.

1 In FIG. 8, the required heat value Q is calculated at a block 2002. In practice, the heat value Q is derived as a function of the ambient air temperature $T_a$ and the insolation value $Z_c$. The calculation process is described in detail in the co-pending U.S. patent application No. 603,829 filed on the same day as the present application under the title "METHOD AND SYSTEM FOR AIR CONDITIONER CONTROL", claiming convention priority on the basis of Japanese Patent Application No. Showa No. 58-169743, filed Sept. 14, 1983. After the block 2002, the set temperature $T_s$ is read out at a block 2004. Then, the mode selecting criteria values a, b and c as reference values are read out from ROM in terms of the set temperature $T_s$, at a block 2006. As will be appreciated from FIG. 9, the criteria value a is representative of an ideal heat value required to increase or decrease the inside temperature to the desired level. The value b is representative of the VENT/BI-LEVEL threshold and the value c is representative of BI-LEVEL/HEATER threshold.

At a block 2008, the derived heat value Q is compared with the value a. When the heat value Q is larger than the value a, the heat value Q is then compared with the value b (VENT/BI-LEVEL) at a block 2010. If the heat value Q is also larger than the value b, then VENT mode is selected at a block 2012. On the other hand, if the heat value Q is equal to or smaller than the value b, BI-LEVEL mode is selected at a block 2014. After the blocks 2012 or 2014, program execution ends.

When the heat value Q when checked at the block 2008 is equal to or less than the value a, the heat value Q is compares with the value c (BI-LEVEL/HEATER) at a block 2016. If the heat value Q is larger than the value c, then BI-LEVEL mode is selected at the block 2014. On the other hand, if the heat value Q is equal to or smaller than the value c, HEATER mode is selected at a block 2018. The program then ends.

When VENT mode is selected at the block 2012, the controller 56 sends a pair of control signals to the mode selecting actuator 66 through the output interface 210. As VENT mode has been selected, the actuator 66a is operated to its first position to hold the upper vent air outlet 22 open and the defroster nozzle closed. On the other hand, the actuator 66b is operated to its second position to seal the lower vent air outlet with the lower vent air outlet shutter 88.

When BI-LEVEL mode is selected at the block 2014, the actuator 66a remains in its aforementioned first position On the other hand, the actuator 66b is shifted to its first position to open the lower vent air outlet in order to discharged conditioned air. When HEATER mode is selected at the block 2018, the actuator 66a is shifted to its third position to close both the upper vent air outlet and the defroster nozzle. The actuator 66b is then maintained in its first position to open the lower vent air outlet.

As set forth above, according to the shown embodiment, operation mode of the air conditioning system is selected according to external thermodynamic conditions including an ambient air temperature factor and an insolation factor. This automatically selected operation mode is more likely to coincide with that manual selected by the passenger compartment occupants, than that due to solely air-mix door open-degree-dependent selection as in the prior art.

Figure 10:
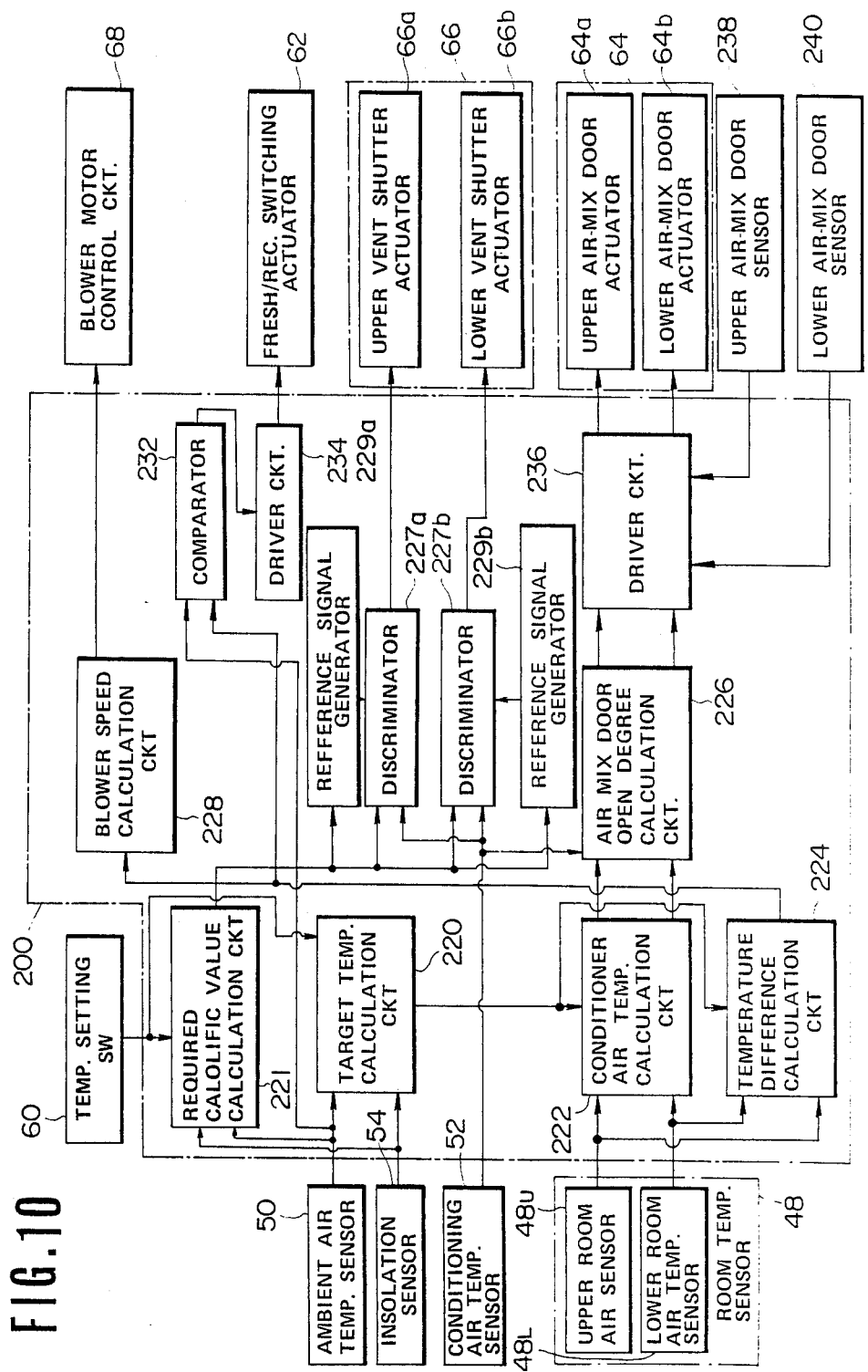
FIG. 10 is a block diagram of another embodiment of the controller in the preferred embodiment of the air conditioning system of FIG. 3.

FIG. 10 shows another embodiment of the air conditioning system controller 56 of FIG. 3. A target temperature calculation circuit 220 is connected to the ambient air temperature sensor 50 and the temperature selecting unit 60 which is manually operated to select a desired room temperature. The target temperature calculation circuit 220 receives the ambient air temperature-indicative signal from the ambient air temperature sensor 50 and a set temperature-indicative signal from the temperature selecting unit 60. Based on the ambient temperature-indicative signal and the set temperature-indicative signal, the target temperature calculation circuit 220 derives a target temperature and produces a target temperature-indicative signal. The target temperature-indicative signal is fed to a conditioned air temperature calculation circuit 222.

As stated previously, the air conditioning system controlled by the controller 56 has upper and lower vent air-mix chambers, the air temperatures of which are controlled independently. Therefore, the conditioned air temperature calculation circuit 222 is connected to an upper room air temperature sensor 48U and a lower room air temperature sensor 48L which together comprise the room air temperature sensor 48.

The conditioned air temperature calculation circuit 222 drives a target temperature for the air to be discharged through each of the upper and lower vent air outlets independently based on the upper section room temperature-indicative signal from the upper room air temperature sensor 48U and the lower section room temperature-indicative signal from the lower room air temperature sensor 48L. The conditioned air temperature calculation circuit 222 sends the independently derived upper and lower conditioned air target temperature-indicative signals to an air-mix door open-degree calculation circuit 226. The air-mix door open-degree calculation circuit 226 calculates the required positions of the upper and lower air-mix doors 82, 84 and 86 and produces air-mix door control signals for controlling the air-mix doors. The air-mix door control signals are fed to a driver circuit 236 associated with upper and lower air-mix door actuator 64 which operates or moves the upper and lower air-mix doors 82, 84 and 86 to the derived positions. The driver circuit 236 is connected to upper and lower air-mix door sensors 238 and 240 which are respectively adapted to produce open-degree indicative feedback signals. Based on the air-mix door control signals and the open-degree-indicative feedback signals, the driver circuit 236 produces driver signals for moving the air-mix doors 82, 84 and 86 to the positions derived by the air-mix door open-degree calculation circuit 226.

On the other hand, the target room temperature calculation circuit 220 is connected for output to a temperature difference calculation circuit 224. The upper and lower room temperature sensor 48U and 48L are also connected to the temperature difference calculation circuit 224. The temperature difference calculation circuit 224 derives an average room temperature value based on the upper and lower room-temperature indicative signals from the upper and lower room temperature sensors 48U and 48L. The temperature difference calculation circuit 224 also derives the temperature difference between the target temperature indicated by the target temperature-indicative signal from the target temperature calculation circuit 220 and the average room temperature and produces a temperature difference-indicative signal.

A blower speed calculation circuit 228 is connected to the temperature difference calculation circuit 224 to receive therefrom the temperature difference-indicative signal. Based on the temperature difference-indicative signal, the blower speed calculation circuit 228 derives the blower voltage to be supplied to the blower motor. The blower motor voltage-indicative signal is sent by the blower speed calculation circuit 228 to the blower motor control circuit 68.

A heat value calculation circuit 221 is connected to the ambient temperature sensor 50 and the insolation sensor 54 to receive therefrom the ambient air temperature-indicative signal and the insolation value-indicative signal. The heat value calculation circuit 221 is also connected to the temperature selecting unit 60 to receive therefrom the set temperature indicative signal. The heat value calculation circuit 221 calculates the heat value Q required to be increased and decreased to adjust the room air temperature to the desired temperature. The heat value calculation circuit 221 outputs a required heat value indicative signal to comparators 227a and 227b. The comparators 227a, b are connected to corresponding reference signal generators 229a,b to receive respectively a VENT/BI-LEVEL threshold indicative reference signal and a BI-LEVEL/HEATER threshold indicative reference signal which are to compared to the heat value Q.

The comparator 227b sends a HIGH-level comparator signal to the actuator 66b which then closes the lower vent air outlet shutter 88, when the required heat value indicative signal value Q is less than the VENT/BI-LEVEL threshold indicative reference signal value. In this case, since the BI-LEVEL/HEATER threshold is greater than the VENT/BI-LEVEL threshold, the comparator 227a also outputs a HIGH-level comparator signal to the actuator 66a. The actuator 66a is responsive to the HIGH-level comparator signal to open the upper vent air outlet shutter. Therefore, when the required heat value Q is less than the VENT/BI-LEVEL threshold, the air conditioning system is operated in VENT mode.

On the other hand, when the required heat value indicative signal value Q is equal to or greater than the VENT/BI-LEVEL threshold indicative reference signal value, the comparator 227b outputs a LOW-level comparator signal to the actuator 66b. Thus the actuator 66b operates the lower vent outlet shutter 88 to open the lower vent air outlet. If the required heat value Q is also equal to or greater than BI-LEVEL/HEATER threshold and thus the required heat value indicative signal value is equal to or greater than the BI-LEVEL/HEATER threshold indicative reference signal value, the comparator 227a outputs a LOW-level comparator signal. The actuator 66a is responsive to the LOW-level comparator signal from the comparator 227a to actuate the upper vent air outlet shutter to close the upper vent air outlet.

Therefore, when the required heat value Q is equal to or greater than the VENT/BI-LEVEL threshold and is less than the BI-LEVEL/HEATER threshold the air conditioning system is operated in BI-LEVEL mode. On the other hand, when the required heat value Q is equal to or greater than the BI-LEVEL/HEATER threshold the air conditioning system is operated in HEATER mode.

As set forth above, according to the present invention, operation mode of the air conditioning system is controlled in accordance with external thermodynamic conditions of the vehicle or temperature conditions. Therefore, mode selection may more closely correspond to manual selections which would be made by the passenger compartment occupants than in conventional procedures.

Thus, the invention fulfills all of the objects and advantages sought therefor.

What is claimed is:

1. An automatic air conditioning system for an automotive vehicle comprising:
    an air induction system including a cool air source and a hot air source;
    a first air mix chamber connecting said induction system and a first lower air outlet;
    a second air mix chamber connecting said induction system and a second upper air outlet;
    a first means for controlling the proportions of cool air and hot air delivered by said induction system to said first and second air mix chambers;
    a passage connecting the outlet of said hot air source to said first and second air mix chambers, said passage including a first end opening to said first air mix chamber and a second end opening to said second air mix chamber;
    first and second shutter doors respectively adapted to open and close said first and second air outlets, each of said first and second shutter doors being movable between a first position in which it closes the corresponding one of said first and second air outlets and a second position in which it opens the corresponding air outlet;
    a temperature selecting means for designating a desired room temperature to which the passenger compartment air temperature is to be adjusted;

a second means for detecting at least one preselected external condition and deriving the heat value required to adjust the room temperature to said designated desired room temperature;

an air flow control means for controlling a flow rate of cool air and hot air to said first and second chambers on the basis of said heat value; and a mode selector means, responsive to said second means, for deriving a control signal to operate said first and second shutter doors to corresponding ones of said first and second positions in accordance with the derived heat value, said mode selector means comparing said heat value with a first heating/cooling selector criterion which is a criterion for determining a heating condition requiring addition of heat to the room air and a cooling condition requiring removal of heat from the room air, a second cooler mode selecting criterion so as to operate said first shutter door to said first position and said second shutter door to said second position when said heat value is greater than said first heating/cooling selector criterion and is greater than said second cooler mode selecting criterion, with a third heater mode selecting criterion so as to operate said first shutter door to said second position and said second shutter door to said first position when said heat value is smaller than said first heating/cooling selector criterion and is smaller than said third heater mode selecting criterion, and said mode selector means operating said first and second shutter doors to said second position when said heat value is greater than said third criterion and is smaller than said second criterion, and said mode selector means varying the heat value difference between said second cooler mode selecting criterion and said third heater mode selecting criterion depending upon said designated desired room temperature.

2. The automatic air conditioning system as set forth in claim 1, wherein said second means includes an ambient air temperature sensor for detecting the temperature of ambient air as said at least one preselected external condition.

3. The automatic air condition system as set forth in claim 1, wherein said second means includes an insolation sensor for detecting the intensity of incident sunlight as said at least one preselected external condition.

* * * * *